(12) United States Patent  (10) Patent No.: US 7,805,675 B2
Cradick et al.  (45) Date of Patent: Sep. 28, 2010

(54) METHODS, SYSTEMS, AND COMPUTER PROGRAM PRODUCTS FOR RECREATING EVENTS OCCURRING WITHIN A WEB APPLICATION

(75) Inventors: Ryan K. Cradick, Rochester, MN (US);
R. Eric Morter, Rochester, MN (US);
John S. Warren, Durham, NC (US);
Timothy D. Zosel, Winona, MN (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 11/419,221

(22) Filed: May 19, 2006

(65) Prior Publication Data

US 2007/0271273 A1   Nov. 22, 2007

(51) Int. Cl.
G06F 3/00 (2006.01)
G06F 3/048 (2006.01)
G06F 7/00 (2006.01)
G06F 12/00 (2006.01)
(52) U.S. Cl. .................. 715/704; 715/705; 715/789; 707/672; 707/748; 707/751; 707/830; 707/999.01
(58) Field of Classification Search ................ 715/704, 715/736, 737, 760, 969; 707/672, 751, 748, 707/830, 999.01
See application file for complete search history.

(56) References Cited

U.S. PATENT DOCUMENTS 5,974,572 A * 10/1999 Weinberg et al. ............. 714/47
6,002,871 A * 12/1999 Duggan et al. ............... 717/135
6,085,224 A *  7/2000 Wagner ....................... 709/203

(Continued)

FOREIGN PATENT DOCUMENTS

JP   2004185189 A  *  7/2004

(Continued)

OTHER PUBLICATIONS

Corporate Headquarters Cisco Systems, Inc.; Cisco Content Services Switch Command Reference; Software Version 5.00; Jun. 2001; http://www.cisco.com/en/US/docs/app_ntwk_services/data_center_app_services/css11000series/v5.00/command/reference/cmd_ref.pdf; Chapter 2; 645 pages.*

*Primary Examiner*—Dennis-Doon Chow
*Assistant Examiner*—Linh K Pham
(74) *Attorney, Agent, or Firm*—Cantor Colburn LLP; Feb Cabrasawan

(57) ABSTRACT

A method, system, and computer program product for re-creating events occurring within a Web application is provided. The method includes receiving a request to perform an action from a client system accessing the Web application over a network. The method also includes generating a log file for the client system and recording the request and a timestamp of the request in the log file. The method further includes collecting client system information, executing the request, and recording the client system information and request execution details in the log file. Upon the occurrence of a triggering event, the method includes generating scripts to re-create the request and the request execution details, executing the scripts within the Web application and the operating environment of the client system that is re-produced using the client system information, and recording and evaluating results of execution of the scripts to identify any issues or evaluate client system experiences with the Web application.

20 Claims, 3 Drawing Sheets

U.S. PATENT DOCUMENTS

| | | |
|---|---|---|
| 6,539,542 B1 * | 3/2003 | Cousins et al. ............... 717/151 |
| 6,549,944 B1 * | 4/2003 | Weinberg et al. ........... 709/224 |
| 6,571,285 B1 * | 5/2003 | Groath et al. ............... 709/223 |
| 6,772,107 B1 * | 8/2004 | La Cascia et al. .............. 703/21 |
| 6,985,901 B1 * | 1/2006 | Sachse et al. ...................... 1/1 |
| 7,013,251 B1 * | 3/2006 | Nace et al. ..................... 703/13 |
| 7,167,776 B2 * | 1/2007 | Maharajh et al. ............ 700/266 |
| 7,194,664 B1 * | 3/2007 | Fung et al. ..................... 714/45 |
| 7,233,929 B1 * | 6/2007 | Lingle et al. ................. 705/402 |
| 7,412,371 B2 * | 8/2008 | Fisher et al. ................... 703/17 |
| 7,441,153 B1 * | 10/2008 | Chitre et al. .................. 714/38 |
| 2001/0004744 A1 * | 6/2001 | Lazaridis et al. ............. 709/206 |
| 2002/0019886 A1 * | 2/2002 | Sanghvi et al. ............. 709/318 |
| 2002/0042821 A1 * | 4/2002 | Muret et al. ................. 709/223 |
| 2002/0078381 A1 * | 6/2002 | Farley et al. ................. 713/201 |
| 2002/0152284 A1 * | 10/2002 | Cambray et al. ............ 709/218 |
| 2002/0198882 A1 * | 12/2002 | Linden et al. ................. 707/10 |
| 2003/0055808 A1 * | 3/2003 | Bhat .............................. 707/1 |
| 2003/0055809 A1 * | 3/2003 | Bhat .............................. 707/1 |
| 2003/0056171 A1 * | 3/2003 | Yone et al. .................. 715/505 |
| 2003/0154135 A1 * | 8/2003 | Covington et al. ........... 705/26 |
| 2004/0039728 A1 * | 2/2004 | Fenlon et al. ................... 707/1 |
| 2004/0117658 A1 * | 6/2004 | Klaes ......................... 713/201 |
| 2004/0243349 A1 * | 12/2004 | Greifeneder et al. ........ 702/183 |
| 2004/0254919 A1 * | 12/2004 | Giuseppini ..................... 707/3 |
| 2005/0092825 A1 * | 5/2005 | Cox et al. .................... 235/375 |
| 2005/0144074 A1 * | 6/2005 | Fredregill et al. .............. 705/14 |
| 2005/0165889 A1 * | 7/2005 | Muret et al. ................. 709/203 |
| 2005/0193036 A1 * | 9/2005 | Phillips et al. .............. 707/202 |
| 2005/0193269 A1 * | 9/2005 | Haswell et al. ................ 714/38 |
| 2005/0203952 A1 * | 9/2005 | Deily et al. ................. 707/104.1 |
| 2005/0278728 A1 * | 12/2005 | Klementiev ................. 719/328 |
| 2005/0286366 A1 * | 12/2005 | Okamoto .................... 369/47.5 |
| 2006/0004862 A1 * | 1/2006 | Fisher et al. ............. 707/104.1 |
| 2006/0031054 A1 * | 2/2006 | Nace et al. ..................... 703/13 |
| 2006/0047551 A1 * | 3/2006 | Cotten et al. ..................... 705/8 |
| 2006/0089996 A1 * | 4/2006 | Peiffer ......................... 709/227 |
| 2006/0100972 A1 * | 5/2006 | Chianese et al. ............... 707/1 |
| 2006/0101447 A1 * | 5/2006 | Koch .......................... 717/168 |
| 2006/0116200 A1 * | 6/2006 | Leen et al. ..................... 463/25 |
| 2006/0136187 A1 * | 6/2006 | Nace et al. ..................... 703/13 |
| 2006/0179028 A1 * | 8/2006 | Bram et al. .................... 706/47 |
| 2006/0187048 A1 * | 8/2006 | Curkendall et al. ...... 340/572.4 |
| 2007/0033273 A1 * | 2/2007 | White et al. ................. 709/223 |
| 2007/0260774 A1 * | 11/2007 | Bendapudi ................... 710/36 |

FOREIGN PATENT DOCUMENTS

KR            2002012855        *    2/2002

* cited by examiner

METHODS, SYSTEMS, AND COMPUTER PROGRAM PRODUCTS FOR RECREATING EVENTS OCCURRING WITHIN A WEB APPLICATION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to system diagnostics, and particularly to methods, systems, and computer program products for re-creating events occurring within a Web application.

2. Description of Background

Debugging a program found in a Web application by a customer can be a very difficult task. Due to the number of different execution paths that the user may have taken before actually seeing the bug in question can create a scenario that is very difficult, if not impossible, for the developers to reproduce. As a result, debugging these problems consumes valuable time and resources.

Current solutions provide some assistance; however, their nature effectively changes the environment in which the error originally occurred. These changes to the environment can affect the Web application and, in some cases, change the way in which the problem in question manifests itself. Client-side solutions typically record the user's actions to the client via a Web browser plug-in. Since the actions are recorded on the client's machine, the usage information is not available to developers for debugging. Server-side solutions test only the server-side code and, therefore, any problems related to the browser cannot be re-produced.

What is needed, therefore, is a solution that can re-create a user's experience during execution of a Web application in order to identify and address any issues that are manifested during the execution.

SUMMARY OF THE INVENTION

The shortcomings of the prior art are overcome and additional advantages are provided through the provision of a method for re-creating events occurring during execution of a Web application. The method includes receiving a request to perform an action from a client system accessing the Web application over a network. The method also includes generating a log file for the client system and recording the request and a timestamp of the request in the log file. The method further includes collecting client system information, executing the request, and recording the client system information and request execution details in the log file. Upon the occurrence of an event trigger, the method includes generating scripts to re-create the request and the request execution details, executing the scripts within the Web application and the operating environment of the client system that is re-produced using the client system information, and recording and evaluating results of execution of the scripts to identify any issues or evaluate client experiences with the Web application.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that re-creates a user's experience during execution of a Web application in order to identify and address any issues that are manifested during the execution or assess the user's experiences with the Web application. The user's experience is re-created by recording user events and environmental information which are used in generating scripts that emulate the user's experience and operating environment within the same Web application in order to re-produce any issues that were manifested during the user's experience or to evaluate the user's experiences with the Web application.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

The logging and replay activities provides the capability to re-create a user's experience during execution of a Web application in order to identify and address any issues that are manifested during the execution and/or assess performance details. The issues and performance information may be evaluated and prioritized by developers associated with the Web application in order to address serious issues in a timely manner.

Figure 1:
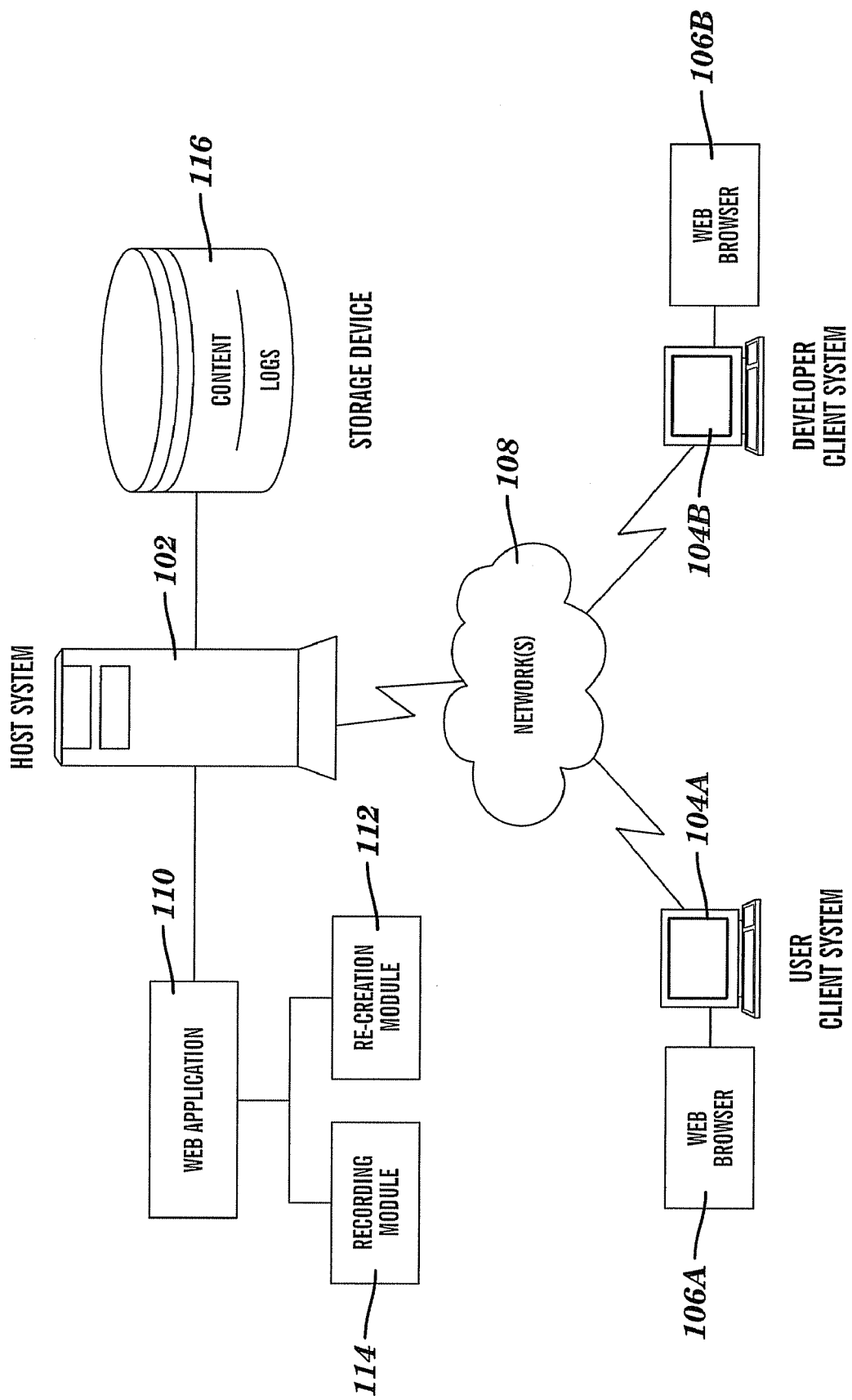
FIG. 1 illustrates one example of a system upon which the logging and replay activities may be implemented in exemplary embodiments.

Referring now to FIG. 1, a system upon which the logging and replay activities may be implemented in exemplary embodiments will now be described. The system of FIG. 1 includes a host system 102 in communication with client systems 104A-B over one or more networks 108.

Host system 102 may be a high speed processing device (e.g., a mainframe computer) that handles large volumes of processing requests from client systems 104A-B. In exemplary embodiments, host system 102 functions as an applications server, Web server, and database management server. In exemplary embodiments, the host system 102 is implemented by a Web enterprise that provides services to Internet users, such as communications (e.g., email, instant messaging, chat rooms, etc.), search engine, online shopping, games, and news, to name a few. While only a single host system 102 is shown in the system of FIG. 1, it will be understood that multiple host systems may be implemented, each in communication with one another via direct coupling or via one or more networks. For example, multiple host systems may be interconnected through a distributed network architecture.

Client systems 104A-B may comprise desktop or general-purpose computer devices that generate data and processing requests (e.g., a request to perform a search). For example, user systems 104 may request Web pages, Web forms, documents, links, etc., that are stored in a storage device that is accessible to the host system 102 (e.g., storage device 116). In exemplary embodiments, client systems 104A-B execute one or more applications for accessing information and services over a network (e.g., networks 108). For example, each of client systems 104A-B implements a Web browser application (106A-B, respectively) for communicating with network entities, such as host system 102. In addition, client systems 104A-B implement input/output devices (e.g., display screen, mouse, keyboard, microphone, etc.). Client system 104A is operated by a general user of the Web application services provided by host system 102. For example, client system 104A may be operated by a consumer who has a registered email account with the Web enterprise of host system 102. In exemplary embodiments, client system 104B is operated by a developer or software tester of applications executing on the host system 102, e.g., Web application 110.

Network(s) 108 may be any type of communications network known in the art. For example, network(s) 108 may be an intranet, extranet, or an internetwork, such as the Internet, or a combination thereof. Network(s) 108 may be wireless, wireline, or a combination thereof.

In exemplary embodiments, host system 102 executes various applications, including a Web server, application server, and database management engine. Other applications, e.g., business applications, may also be implemented by host system 102 as dictated by the needs of the enterprise of the host system 102.

As indicated above, host system 102 executes one or more applications for providing information and/or services to users, such as client system 104 over a network. In exemplary embodiments, host system 102 executes a Web application 110 that provides this information and/or services (e.g., online purchasing, search engine, games, public phone book/address book, communications, such as email, instant messaging, discussion or chat groups, etc.). A Web application refers to software that is accessed via a Web browser over a network. While only one Web application 110 is shown in FIG. 1 for ease of explanation, it will be understood that any number of Web applications may be implemented by host system 102.

Web application 110 executes in conjunction with a recording module 114 and a re-creation module 112 (also referred to herein as 'replay module'). Recording module 114 and re-creation module 112 may be implemented as a plug-in to Web application 110 (e.g., via an application programming interface) where Web application 110 is a commercial off-the-shelf product. Alternatively, the functionality of recording module 114 and re-creation module 112 may be built in to the Web application 110. In addition, the recording module 114 and re-creation module 112 may be configured to operate using an enable feature (and disabled as needed).

Recording module 114 collects and logs user-generated events (i.e., events initiated by a user of client system 104A). These user-generated events are recorded in a log file and stored in a storage device (e.g., storage device 116). User-generated events may include link selection, changing HTML form elements, user interface element selections, form submission, mouse movements (e.g., capturing mouse-generated events, recording mouse position for movements), multi-media selections, etc. Recording module 114 also collects and records client system information from the client system 104A, such as browser type (e.g., Netscape Navigator™, Internet Explorer™), browser version, themes, plug-ins, etc. Other client system information collected includes Internet connectivity data, central processing unit (CPU) usage data, memory usage data, running applications data, system services, etc. The collecting and logging activities may be implemented using, e.g., Servlet logging techniques, Java Script event listeners, mouse tracking tools, browser plug-ins, software logging tools, etc. The log file stores the information using a data structure, such as the data structure shown in FIG. 3.

Host system 102 is also in communication with storage device 116. Storage device 116 may comprise one or more repositories of information utilized by the Web application 110. For example, storage device 116 may store Web pages, Web forms, documents, images, etc.

Figure 2:
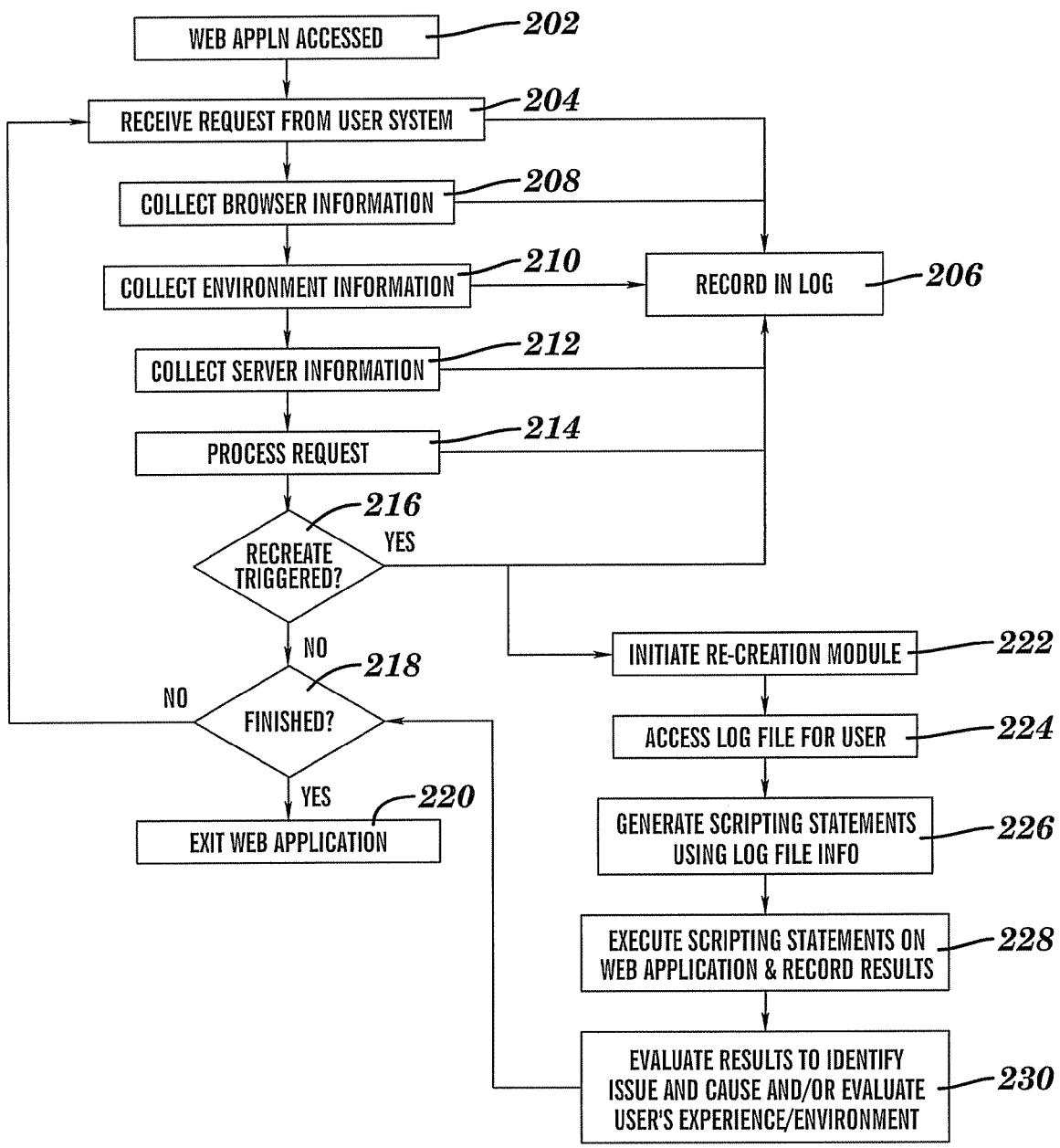
FIG. 2 illustrates one example of a flow diagram describing a process for implementing the logging and replay activities.
Figure 3:
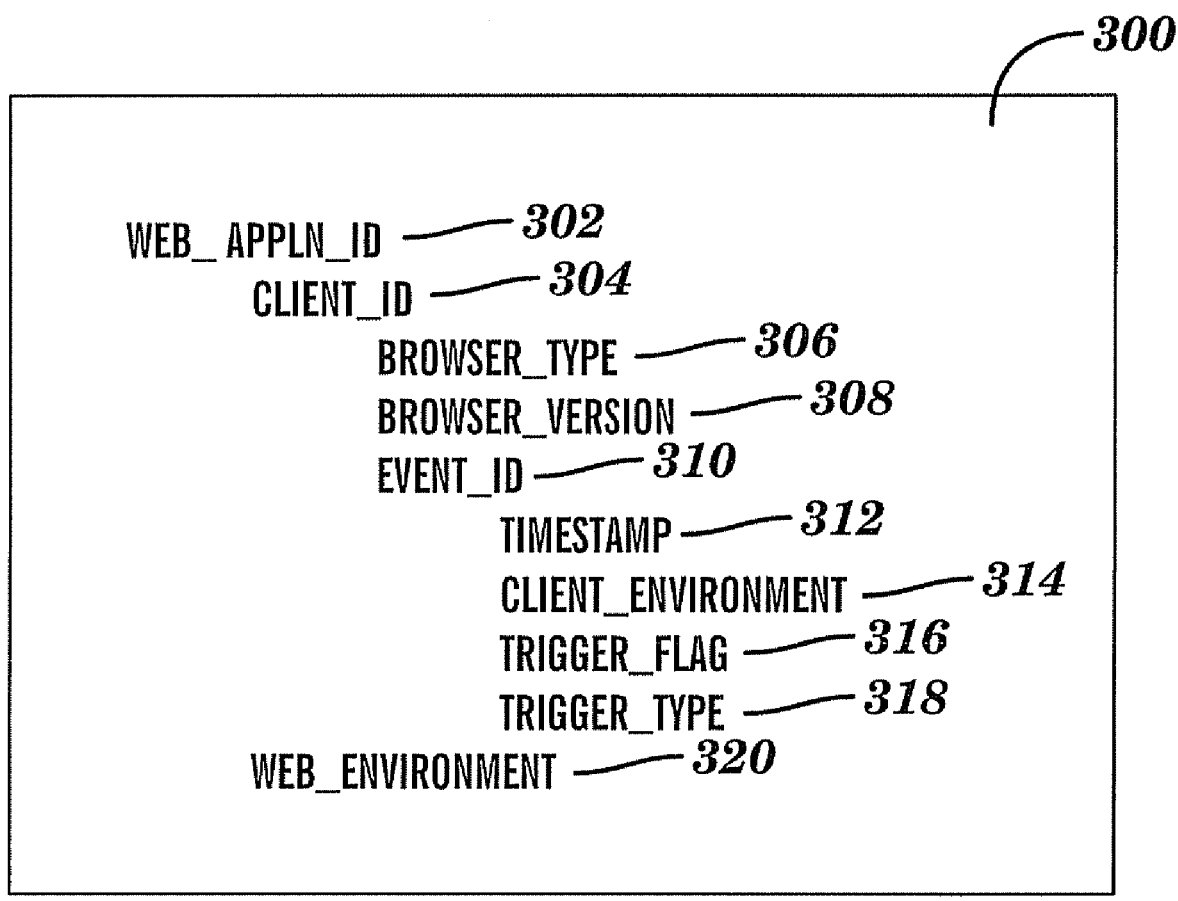
FIG. 3 illustrates one example of a data structure for recording a user's experience and operating environment in exemplary embodiments.

Turning now to FIG. 2, a process for implementing the logging and replay activities will now be described in exemplary embodiments. At step 202, the Web application 110 (e.g., search engine, email program, etc.) is accessed by a user at client system 104A and the recording module 114, if enabled, is initialized. At step 204, the Web application receives a request (e.g., a search request, request to access data or forms, etc.) from the client system 104A and the recording module 114 generates a log file and stores the log file in storage device 116. The log file is unique to the client system 104A and may be distinguished using an identifier, such as the IP address of the client system. For example, a sample data structure used in capturing client system information is shown in FIG. 3. The data structure 300 of FIG. 3 identifies the Web application 110 via WEB_APPLN_ID field 302. The client system 104A is identified via CLIENT_ID field 304.

At step 206, request information is stored in the log file. The request may be recorded in EVENT_ID field 310 along with a timestamp of the request (e.g., in TIMESTAMP field 312). As indicated above, the request may be a request for a Web page, a Web form, a search, etc. The request is captured as a user-generated event based upon the client system 104A inputs (e.g., mouse clicks, keyboard entries, etc.).

At step 208, the recording module 114 collects browser information for the client system 104A (e.g., browser type stored in BROWSER_TYPE field 306 and browser version stored in BROWSER_VERSION field 308). This information is used by the re-creation module 112 to re-produce the client system information as will be discussed further herein. This browser information collected is stored in the log file at step 206.

At step 210, the recording module 114 collects client system operating environment information. This operating environment information includes, for example, Internet connectivity data, CPU usage, memory usage, running applications, and system services, to name a few. The operating environment information of the client system 104A is recorded in the log file at step 206 (via, e.g., CLIENT_ENVIRONMENT field 314). Optionally, the recording module 114 may also collect server environment information, that is, operating environment information associated with the host system 102 at the time the client system request is received. This server environment information is collected at step 212 and recorded in the log file at step 206 (e.g., via WEB_ENVIRONMENT field 320).

At step 214, the Web application 110 processes the request. The processing that occurs is dependent upon the nature of the request. For example, if the request is directed to a search request, the processing includes, e.g., accessing one or more databases of content in storage device 116 and searching the database(s) based upon information provided in the request. The request execution may include retrieving and transmitting a Web page, retrieving, transmitting, or receiving a Web form, or performing an algorithm. The execution of the request, or request execution details, are captured and stored in the log file at step 206.

At step 216, it is determined whether a triggering event has occurred. A triggering event activates the re-creation module 112 as described herein. A triggering event may be an issue detected relating to an error or performance degradation that occurs during the request processing. For example, an issue may be a decrease in processor speed, a failure of the Web application to complete the request execution, an abnormal termination of the Web application or other application executing during the request execution, etc. The issue may be identified when the client system transmits an error notification prompted by a message received at the client system 104A. The issue may alternatively be identified by the host system 102 based upon processing details captured during execution of the request, or other similar means. Some issues have known causes. If the issue has an identified cause, the host system 102 may transmit a notification to the client system 104A that addresses the issue and possible solutions.

In alternative exemplary embodiments, the triggering event may be a request from developer client system 104B to recreate the request execution details and user environment that has been captured in record 300. For example, a developer or human factors engineer may prompt the re-creation module 112 in order to perform remote usability testing, whereby a remotely located test subject (e.g., client system 104A) can be observed navigating through a Web application, without the need for screen sharing technology (e.g., Netmeeting™). In this scenario, the request execution details and user environment is recreated in real time, regardless of the presence or absence of any error conditions.

If no triggering event has occurred at step 216, it is determined whether additional requests for the Web application 110 exist at step 218. If so, the process returns to step 204 where another request is received by the Web application 110. Otherwise, the Web application 110 is exited at step 220.

If there is a triggering event at step 216 (e.g., a request from developer client system 104B or an issue detected with no known cause), it is recorded in the log file at step 206 (via, e.g., TRIGGER_FLAG field 316 and TRIGGER_TYPE field 318) and the replay module 112 is initiated either automatically or by a developer at client system 104B at step 222. The replay module 112 may be initiated immediately after detecting the triggering event or may be implemented, e.g., for many detected issues at some future time.

At step 224, the replay module 112 accesses the log file for the client system 104A which presented the issue via, e.g., the CLIENT_ID field 304. The replay module 112 generates scripts to emulate the user's experience using the information captured in the log file at step 226. Thus, the browser type, browser version, operating environment, etc., may be reproduced along with the user-generated events (e.g., requests) and request execution details in order to re-produce the an that occurred during the user's experience or simply to review/evaluate the user's experience with the Web application. The scripts are executed at step 228, and this execution of the scripts occurs within the same Web application as that which was executed when the triggering event occurred.

Results of the execution of the scripts are evaluated by the developer at client system 104B in order to identify any issues and determine its cause, or to evaluate characteristics of the user's experience with the Web application 110.

The process returns to step 218, whereby the Web application 110 determines whether there are any additional requests to be processed.

The issues may be prioritized by the developer in order to evaluate and resolve more serious issues before addressing less serious issues.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may male various improvements and enhancements which fall within the scope of the claims which follow. These claims should be construed to maintain the proper protection for the invention first described.

What is claimed is:

1. A method for re-creating events occurring within a Web application, the Web application, a recording module, and a playback module executing on a single computer processing device, the method comprising:

the recording module performing:

receiving a request to perform an action at a host system computer from a client system accessing the Web application over a network;

generating a client specific log file on the host system computer, the client specific log file created for each client system accessing the Web application, the client specific log file comprising client system-generated event fields for recording client system-generated events responsive to the request received from the client system, the client system-generated events corresponding to functions available via the Web application, the client system-generated events including:

selecting a link;
changing HTML form elements;
user interface element selections;
submitting a form;
moving a mouse at the client system; and
multi-media selections;

recording the request and a timestamp of the request in the log file;

collecting client system information including Web browser type, Web browser version, operating environment of the client system, and timestamps corresponding to the operating environment;
executing the request;
recording the client system information and request execution details in the client specific log file; and
upon the occurrence of a trigger event, the playback module performs:
generating scripts to re-create the request and the request execution details;
executing the scripts within the Web application on the host system computer, the host system computer reproducing the operating environment of the client system using the client system information; and
recording and evaluating results of execution of the scripts to identify any issues or evaluate client system experiences with the Web application;
wherein the trigger event includes a request to recreate the client system's experience with the Web application; and
wherein the recording module and the playback module are built into the Web application and are configured to operate via an enable and disable feature, the enable and disable feature selectively employed via the Web application.

2. The method of claim 1, wherein the request to recreate the client system's experience with the Web application is generated by a developer client system, wherein the evaluating further includes performing remote usability testing for the re-produced operating environment of the client system.

3. The method of claim 1, wherein the client specific is distinguishable via an Internet Protocol (IP) address of the client system.

4. The method of claim 1, wherein the operating environment includes at least one of:
Internet connectivity status;
central processing unit usage;
memory usage;
running applications; and
system services.

5. The method of claim 1, wherein the request execution details include at least one of:
retrieving a Web page;
transmitting a Web page;
results of performing a search;
retrieving a Web form;
transmitting a Web form;
receiving a Web form; and
performing an algorithm.

6. The method of claim 1, wherein the issues include at least one of:
performance degradation of the client system;
failure of the Web application to successfully complete execution of the request; and
abnormal termination of the Web application; and
wherein the triggering event further includes:
detection of an issue.

7. A system for re-creating events occurring within a Web application, comprising:
a host system computer executing a Web application, the host system computer in communication with a client system over a network;
a storage device in communication with the host system computer;
a recording module executing on the host system computer and in communication with the Web application; and
a playback module executing on the host system computer and in communication with the Web application and the recording module; wherein
the recording module performs:
receiving a request to perform an action from the client system accessing the Web application over the network;
generating a client specific log file on the host system computer, the client specific log file created for each client system accessing the Web application, the client specific log file comprising client system-generated event fields for recording client system-generated events responsive to the request received from the client system, the client system-generated events corresponding to functions available via the Web application, the client system-generated events including:
selecting a link;
changing HTML form elements;
user interface element selections;
submitting a form;
moving a mouse at the client system; and
multi-media selections;
recording the request and a timestamp of the request in the log file;
collecting client system information including Web browser type, Web browser version, operating environment of the client system, and timestamps corresponding to the operating environment;
executing the request;
recording the client system information and request execution details in the client specific log file; and
upon the occurrence of a triggering event, the playback module performs:
generating scripts to re-create the request and the request execution details;
executing the scripts within the Web application on the host system computer, the host system computer reproducing the operating environment of the client system using the client system information; and
recording and evaluating results of execution of the scripts to identify any issues or evaluate client system experiences with the Web application;
wherein the trigger event includes a request to recreate the client system's experience with the Web application; and
wherein the recording module and the playback module are built into the Web application and are configured to operate via an enable and disable feature, the enable and disable feature selectively employed via the Web application.

8. The system of claim 7, wherein the request to recreate the client system's experience with the Web application is generated by a developer client system, wherein the evaluating further includes performing remote usability testing for the re-produced operating environment of the client system.

9. The system of claim 7, wherein the client specific log file is distinguishable via an Internet Protocol (IP) address of the client system.

10. The system of claim 7, wherein the operating environment includes at least one of:
Internet connectivity status;
central processing unit usage;
memory usage;
running applications; and
system services.

11. The system of claim 7, wherein the request execution details include at least one of:
retrieving a Web page;
transmitting a Web page;
results of performing a search;
retrieving a Web form;
transmitting a Web form;
receiving a Web form; and
performing an algorithm.

12. The system of claim 7, wherein the issues include at least one of:
performance degradation of the client system;
failure of the Web application to successfully complete execution of the request; and
abnormal termination of the Web application.

13. A computer program product comprising a non-transitory storage medium storing instructions for re-creating events occurring within a Web application, the Web application, a recording module, and a playback module executing on a single computer processing device, the instructions for implementing a method, comprising:
the recording module performing:
receiving a request to perform an action from a client system accessing the Web application over a network;
generating a client specific log file on a host system computer, the client specific log file created for each client system accessing the Web application, the client specific log file comprising client system-generated event fields for recording client system- generated events responsive to the request received from the client system, the client system-generated events corresponding to functions available via the Web application, the client system-generated events including:
selecting a link;
changing HTML form elements;
user interface element selections;
submitting a form;
moving a mouse at the client system; and
multi-media selections;
recording the request and a timestamp of the request in the log file;
collecting client system information including Web browser type, Web browser version, operating environment of the client system, and timestamps corresponding to the operating environment;
executing the request;
recording the client system information and request execution details in the client specific log file; and
upon the occurrence of a triggering event, the playback module performs:
generating scripts to re-create the request and the request execution details;
executing the scripts within the Web application on the host system computer, the host system computer reproducing the operating environment of the client system using the client system information; and
recording and evaluating results of execution of the scripts to identify any issues or evaluate client system experiences with the Web application;
wherein the trigger event includes a request to recreate the client system's experience with the Web application; and
wherein the recording module and the playback module are built into the Web application and are configured to operate via an enable and disable feature, the enable and disable feature selectively employed via the Web application.

14. The computer program product of claim 13, wherein the request to recreate the client system's experience with the Web application is generated by a developer client system, wherein the evaluating further includes performing remote usability testing for the re-produced operating environment of the client system.

15. The computer program product of claim 13, wherein the client specific log file is distinguishable via an Internet Protocol (IP) address of the client system.

16. The computer program product of claim 13, wherein the operating environment includes at least one of:
Internet connectivity status;
central processing unit usage;
memory usage;
running applications; and
system services.

17. The computer program product of claim 13, wherein the request execution details include at least one of:
retrieving a Web page;
transmitting a Web page;
results of performing a search;
retrieving a Web form;
transmitting a Web form;
receiving a Web form; and
performing an algorithm.

18. The computer program product of claim 13, wherein the issues include at least one of:
performance degradation of the client system;
failure of the Web application to successfully complete execution of the request; and
abnormal termination of the Web application.

19. The method of claim 1, wherein the issue is identified when the client system transmits an error notification prompted by a message received at the client system.

20. The system of claim 7, wherein the issue is identified when the client system transmits an error notification prompted by a message received at the client system.

* * * * *